United States Patent [19]

Merving

[11] Patent Number: 5,341,594
[45] Date of Patent: Aug. 30, 1994

[54] TREE TREATMENT CAPSULE WITH VOLUMES FOR SEQUENTIALLY DISCHARGING FLUID

[76] Inventor: Hans Merving, August Stalbergsvag 10A, 644 00 Torshalla, Sweden

[21] Appl. No.: 950,247
[22] Filed: Sep. 24, 1992
[51] Int. Cl.$^5$ .............................................. A01G 29/00
[52] U.S. Cl. ................................................ 47/57.5
[58] Field of Search ...................................... 47/57.5

[56] References Cited

U.S. PATENT DOCUMENTS

| | | | |
|---|---|---|---|
| 1,999,458 | 4/1935 | Hollister | 47/57.5 |
| 2,970,404 | 2/1961 | Beaufils et al. | 47/57.5 |
| 3,706,161 | 12/1972 | Jenson | 47/57.5 |
| 4,308,689 | 1/1982 | Jenson et al. | 47/57.5 |
| 4,342,176 | 8/1982 | Wolfe | 47/57.5 |
| 4,344,250 | 8/1982 | Fahlstrom | 47/57.5 |
| 4,905,410 | 3/1990 | Merving | 47/57.5 |

*Primary Examiner*—Ramon S. Britts
*Assistant Examiner*—Joanne C. Downs
*Attorney, Agent, or Firm*—Keck, Mahin & Cate

[57] ABSTRACT

A tree treatment capsule is inserted into a bore formed in a tree and has several volumes from which various fluids used to treat the tree are sequentially discharged. The capsule includes a plastic container having a shank portion, with a first internal cavity having an end opening and containing a first chemical agent, and a head element integrally formed with the shank portion at a location remote from the end opening. The shank portion includes a circumferential recess formed therein, and a plastic plug is provided for sealingly closing the internal cavity. The plastic plug has an outer external diameter which is slightly smaller than the diameter of the end opening, and has another internal cavity formed therein containing a second chemical agent. The plug is partially insertable into the end opening so that a tight fit between the plug and the end opening is provided. The shank portion is broken to release the first chemical agent immediately as an impact force is applied to the head element and moves the head element towards the plastic plug. The plastic plug has another internal cavity formed therein containing a second chemical agent. The end plug is gradually broken down to release the second chemical agent after the first chemical agent has been released.

5 Claims, 3 Drawing Sheets

TREE TREATMENT CAPSULE WITH VOLUMES FOR SEQUENTIALLY DISCHARGING FLUID

This application discloses subject matter which is related to U.S. Patent application Ser. No. 07/559,938, filed Jul. 30, 1990, which is a continuation-in-part of U.S. Patent application Ser. No. 07/555,734, filed Jul. 23, 1990, now U.S. Pat. No. 5,207,021, which is a continuation-in-part of U.S. Patent application Ser. No. 07/410,884, filed Sep. 22, 1989, now U.S. Pat. No. 5,010,684, which is a continuation-in-part of U.S. Patent application Ser. No. 07/393,841, filed Aug. 7, 1989, now U.S. Pat. No. 4,905,410, which in turn is a continuation of U.S. Patent application Ser. No. 07/184,072, filed Apr. 20, 1988, now abandoned.

BACKGROUND OF THE INVENTION

The present invention relates to a tree treatment capsule for feeding one or more chemical agent or agents into plants and, more particularly, to a capsule for delivering at least one chemical agent in stages to the phloem layer of a tree. Such chemical agents could be herbicides or any other tree destroying agents if the treatment is designed to kill the tree, but are more likely to be periodically or sequentially applied fertilizers, fungicides or other medicants or nutrients, since this particular treatment is most suitable for curing the tree from diseases or nutrient deficiencies. The medicants or nutrients are applied automatically by the invention to the tree at different times. The chemical agent contained in an internal cavity of the capsule may be used to treat the tree in one season of the year while the chemical agent contained in another internal cavity may be used to treat the tree in a subsequent season. The capsule, in other words, has volumes or cavities from which the chemical agents are sequentially discharged.

SUMMARY OF THE INVENTION

The particularly constructed tree treatment capsule referred to above is inserted into a bore formed in a tree and has several volumes from which various fluids used to treat the tree are sequentially discharged. The capsule includes a plastic container having a shank portion, with a first internal cavity having an end opening and containing a first chemical agent, and a head element integrally formed with the shank portion at a location remote from the end opening. The shank portion includes a circumferential recess formed therein, and a plastic plug is provided for sealingly closing the internal cavity. The plastic plug has an outer external diameter which is slightly smaller than the diameter of the end opening, and has another internal cavity formed therein containing a second chemical agent. The plug is partially insertable into the end opening so that a tight fit between the plug and the end opening is provided. The shank portion is broken to release the first chemical agent immediately as an impact force is applied to the head element and moves the head element towards the plastic plug. The plastic plug has another internal cavity formed therein containing a second chemical agent. The end plug is gradually broken down to release the second chemical agent after the first chemical agent has been released.

DESCRIPTION OF THE PREFERRED EMBODIMENT

Figure 1:
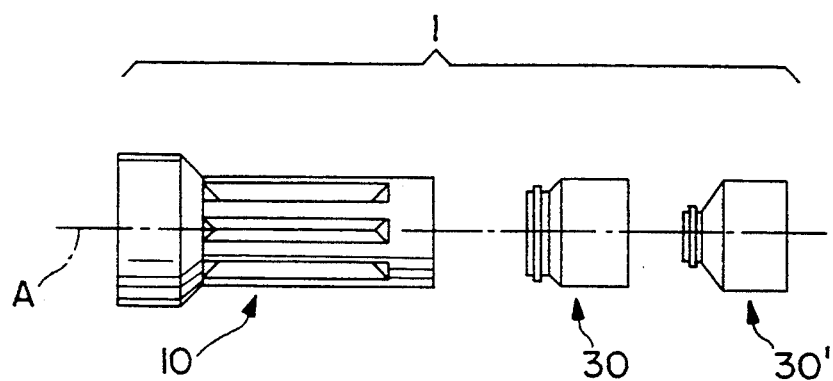
FIG. 1 is an exploded view of a tree treatment capsule in accordance with a preferred embodiment of the present invention.

Referring to the drawings and, in particular, to FIG. 1, the present invention is embodied in a tree treatment capsule 1 adapted for insertion into a pre-drilled bore in the trunk of a tree to be treated. As it is illustrated, the capsule 1 includes a generally cylindrical plastic container 10 and at least one generally cylindrical, hollow plastic end plug 30'. FIG. 1 shows an additional generally cylindrical, hollow plastic intermediate plug 30, which cooperates with the container 10 and the end plug 30' in a manner which will be described shortly. Container 10 and plugs 30 and 30' are initially formed separate from each other, but when capsule 1 is assembled, container 10 and plugs 30 and 30' are secured together and share a common longitudinal axis A.

Figure 2:
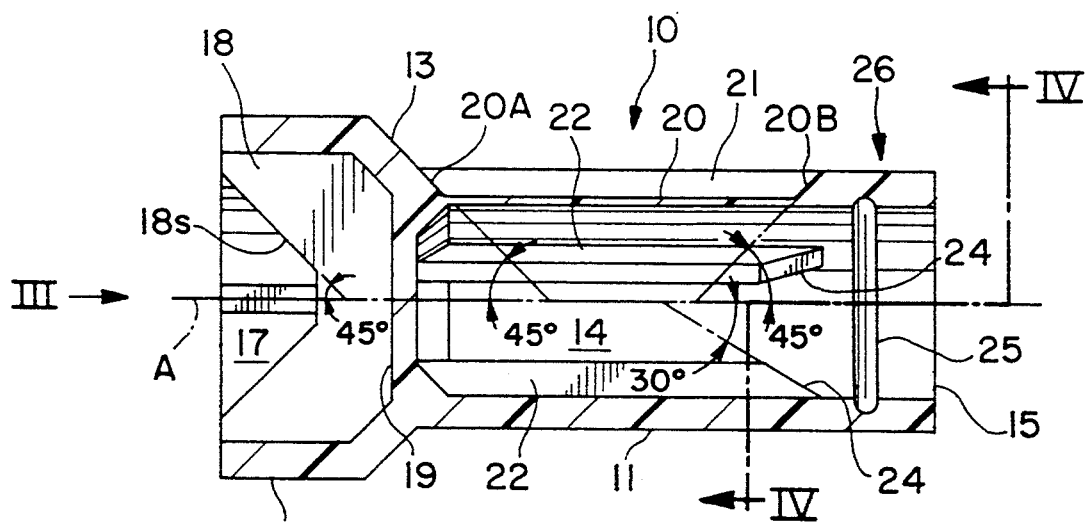
FIG. 2 is a side sectional view of part of the capsule shown in FIG. 1.
Figure 3:
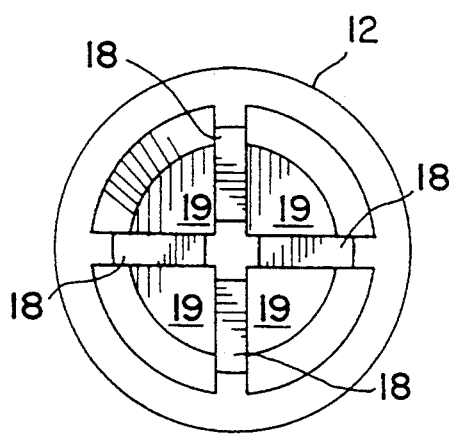
FIG. 3 is an end view of the part of the capsule shown in FIG. 2.
Figure 4:
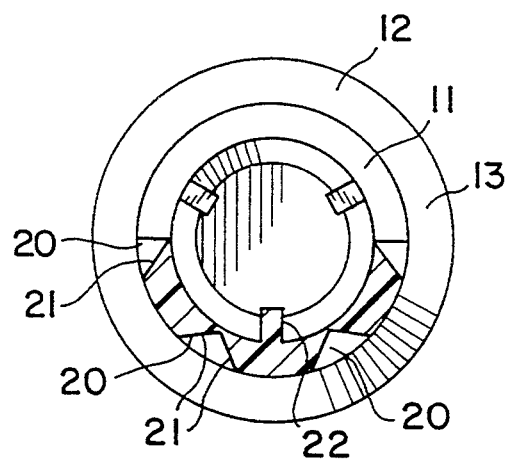
FIG. 4 is an end view, partly in section, of the part of the capsule of FIG. 2 as seen along section line IV—IV.

Referring now to FIGS. 2-4, it can be seen that the cylindrical container 10 may include a cylindrical, hollow shank portion 11 having a cylindrical, hollow head element 12 rigidly joined thereto by a conically tapered, solid transition portion 13. The head element 12 has an outer diameter larger than an outer diameter of the shank portion 11.

The shank portion 11 is formed as a circumferential wall having radially inner and outer surfaces. Shank portion 11 encircles an internal cavity 14 and has a first, open end 15 defining an end opening to the cavity, into which a tree treating chemical agent (not shown), such as a fertilizer, fungicide or insecticide, is placed. The head element 12 also forms an open ended internal cavity 17, in which ribs 18 are integrally formed with the head element 12. Ribs 18 extend crosswise in cavity 17 in order to provide a lightweight and yet strongly reinforced structure to the hollow head element 12. As is apparent from FIG. 2, the axially outer surface lbs of each rib 18 is angled at about 45° relative to longitudinal axis A. Internal cavities 14 and 17 are separated by a partition 19. Partition 19 thus closes a second end of the shank portion opposite the first, open end 15.

The shank portion 11 has a series of, for example six, equally circumferentially spaced, recessed slots 20 formed in the exterior, radially outer surface thereof. These recessed slots 20 longitudinally extend along the shank portion 11 from the junction between transition portion 13 and head element 12 towards open end 15 of the shank portion. As illustrated, recessed slots 20 extend longitudinally along the exterior of shank portion 11 over approximately 80% of the length of the shank portion. As is apparent from FIG. 4, each of the recessed slots is formed by a pair of side walls 21 which diverge from each other at an angle of approximately 90°. Additionally, longitudinally opposite ends 20A and 20B of each slot 20 are each angled at approximately 45° relative to the longitudinal axis A. Recessed slots 20 are sufficiently deep so as to make the shank portion easily breakable along the slots, as will be described.

The shank portion 11 is additionally provided with a plurality of ribs 22. As is apparent from FIGS. 2 and 4 of the drawings, ribs 22 are integrally formed with the rest of the shank portion 11 and extend radially inwardly into cavity 14 from the inner surface of the shank portion. Each rib extends longitudinally along the radially inner surface of shank portion 11 so as to be substantially coextensive with, or equal in length to, recessed slots 20. Referring to FIG. 4, it can be seen that each rib 22 is provided at a circumferential location which is midway between adjacent recessed slots 20. It should be noted, however, that the capsule 1 could include a container 10 which has no ribs. Also, it is not necessary to provide a rib 22 midway between every pair of adjacent recessed slots 20.

As illustrated, three ribs 22 are provided on the radially inner surface of the shank portion at 120° intervals, and at locations between every other pair of adjacent slots 20. Each rib 22 is also provided with an inclined end surface 24 which is oriented at approximately 30° relative to the longitudinal central axis A of the capsule 1. The shank portion 11 additionally includes a circumferential recess 25 provided in the radially inner surface of shank portion 11 at a location which, in the direction of longitudinal axis A of capsule 1, is intermediate the ends of slots 20 and ribs 22 and the first, open end 15 of shank portion 11. This location, which is generally designated by reference number 26 in FIG. 2, is substantially more rigid than the remainder of the portion 11, due to the absence in the location of slots 20.

Figure 5:
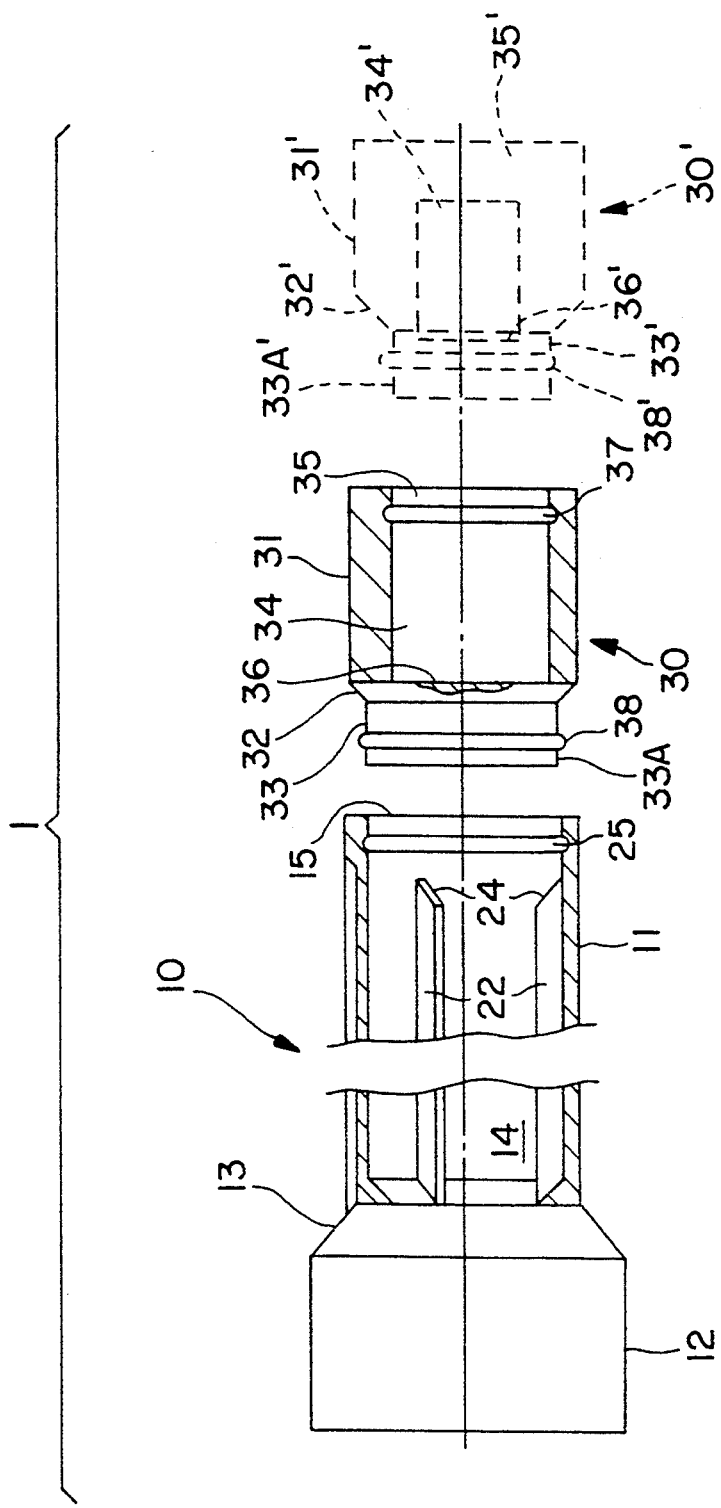
FIG. 5 is an enlarged view of the capsule shown in FIG. 1, partly in section.

Referring to FIG. 5, it is apparent that the intermediate plug 30 shown in FIG. 1 is formed with an internal cavity 34 having a first, open end, generally designated by reference number 35, and second, closed end, generally designated by reference number 36. The internal cavity 34 contains a chemical agent such as a fertilizer, fungicide or insecticide which is to be applied to the tree some time after the chemical agent contained in the internal cavity 14. The plug 30 includes a first cylindrical portion 31, a tapered or inclined portion 32, and a second cylindrical portion 33. As illustrated, the portion 32 is substantially conical. The second cylindrical portion 33 has nearly the same outer diameter as, but is slightly smaller than, the inner diameter of the shank portion 11 so that an end part 33A of the second cylindrical portion 33 is snugly received within cavity 14 when the capsule 1 is fully assembled.

The end part 33A engages inclined end surfaces 24 of ribs 22, if they are provided, when the capsule 1 is fully assembled. A circumferentially protruding ridge 38 is provided on the outer surface of the cylindrical portion 33 at a location between first and second longitudinal ends of the second cylindrical portion 33. As will become clear, when capsule 1 is fully assembled, the ridge 38 of the intermediate plug 30 interlocks with the recess 25 in the radially inner surface of the shank portion 11 to secure the plug 30 in the open end 15 of the shank portion. The radially inner surface of the first cylindrical portion 31 of the intermediate plug 30 is formed with a circumferential recess 37 similar to the circumferential recess 25.

FIG. 5 also shows, in phantom, the generally cylindrical, hollow plastic end plug 30'. The end plug 30' is formed with an internal cavity 34' having solid circumferential walls and first and second closed ends 35' and 36'. Internal cavity 34' contains another chemical agent, such as a fertilizer, fungicide or insecticide, which is to be applied to the tree some time after the chemical agents contained in both the internal cavity 14 and the internal cavity 34. The end plug 30' further includes a first cylindrical portion 31', a tapered or inclined portion 32', a second cylindrical portion 33' having an end part 33A' and a circumferentially protruding ridge 38', which are similar to items 31, 32, 33 and 38 of the intermediate plug 30, respectively. When capsule 1 is fully assembled, the end part 33A', which is only slightly smaller than the opening in open end 35, is snugly received within cavity 34 and the ridge 38' of the end plug 30' interlocks with the recess 37 formed in the radially inner surface of the first cylindrical portion 31 of the plug 30 so as to close the first, open end 35 of the intermediate plug 30 and fluid tightly seal off the internal cavity 34.

All portions of the capsule 1 are made of polyvinylalcohol or a similar material which is easily broken down by, for example, exposure to tree sap, water or ultraviolet light rays. As is clear from FIG. 5, the circumferential wall and the end walls 35' and 36' of the end plug 30' enclosing the internal cavity 34' are thicker than the circumferential wall of the intermediate plug 30 enclosing the internal cavity 34. The walls of the end plug 30', therefore, will be broken down by the sap of the tree some time after the wall of the intermediate plug 30, and a chemical agent contained in the internal cavity 34' will be released after the chemical agents in both of the cavities 14 and 34. Thus, as will become clear, the chemical agent contained in the internal cavity 14 will be released immediately when the capsule 1 is initially used, the chemical agent contained in the internal cavity 34 will then be released after the walls of the intermediate plug 30 are broken down by the tree sap, and finally, the chemical agent contained in the internal cavity 34' will be released after the thicker walls of the end plug 30' are broken down. In other words, the capsule has volumes or cavities from which the chemical agents are sequentially discharged.

In assembling the capsule 1 shown in FIG. 1, a first chemical agent, such as a short term insecticide, is introduced into the cavity 14 of the container 10, and the intermediate plug 30 is inserted into the open end 15 of the container 10. The intermediate plug 30 is forced into the open end 15 until ridge 38 snaps into engagement and is completely received in recess 25. The end part 33A of cylindrical portion 33 tightly fits in the open end 15 and engages the inclined end surfaces 24 of ribs 22. Ridge 38 is completely received in and tightly engaged with recess 25 to completely seal off the open end 15 of container 10. Although a tight fit is obtained between the plug 30 and the container 10 due to the interengagement of the ridge 38 and the recess 25, it is possible to additionally apply an adhesive at the junction between the plug 30 and the container 10 to further secure the end part of cylindrical portion 33 in the open end 15 in order to provide a superior seal.

Another chemical agent, such as a fungicide or another insecticide, is inserted into the internal cavity 34 through the open end 35 of the intermediate plug 30. The end plug 30' is then forced into the open end 35 of the intermediate plug 30 until the ridge 38' snaps into engagement and is completely received in the recess 37. Again, an adhesive may be used at the junction between the end plug 30' and the intermediate plug 30 to provide a superior seal. Forcing plug 30' into the open end 35 of plug 30 fluid tightly seals the second chemical agent within the internal cavity 34. As was mentioned above, yet another chemical agent, such as a fungicide or an insecticide, is contained in the internal cavity 34' of the plug 30'.

Figure 7:
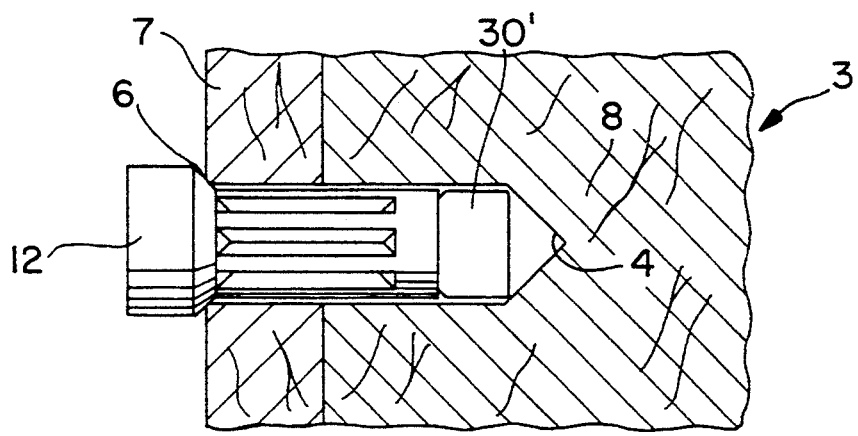
FIG. 7 and 8 are side views illustrating how the capsule of the present invention is used.
Figure 8:
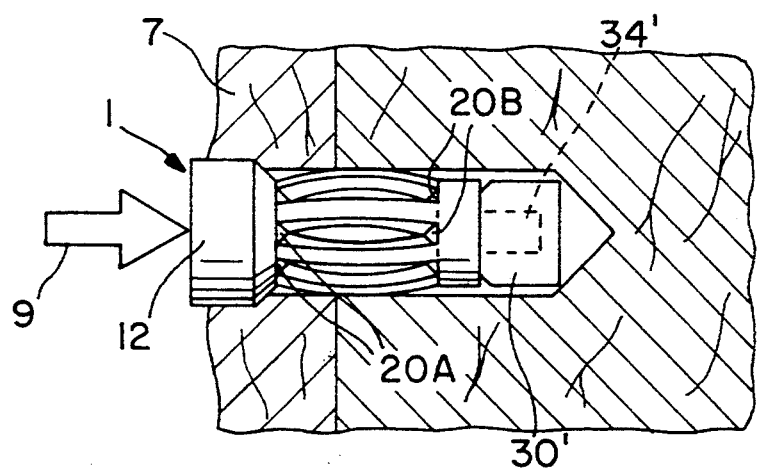

The assembled capsule 1, containing the various chemical agents, is inserted into a pre-drilled bore 4 in the trunk of a tree 3 to be treated. FIGS. 7 and 8 illustrate a capsule including only one plug, i.e., an end plug 30', disposed between the shank portion 11 and the inner end of the pre-drilled bore 4. In this case, the ridge 38' of the end plug 30' is received directly in the recess 25 in the radially inner surface of shank portion 11 rather than in a recess formed in another plug. As FIGS. 7 and 8 show, the bore 4 is dimensioned to extend through the bark 7 and into the phloem layer 8 of the tree 3. The bore 4 is further dimensioned to have an internal diameter between the external diameters of the shank portion 11 and head element 12, respectively, and a depth slightly greater than the length of the shank portion 11, including the plug 30'. The capsule 1 is inserted into the bore 4 of the tree 3 until the end of the plug 30' abuts against a wall, for instance, the bottom wall of the bore 4, as is shown in FIG. 7. This brings the tapered transitional portion 13 of the container 10 into contact with the circumferential edge 6 of the bore 4.

Impact force is applied to the head element 12 by, for example, hammering, in the direction shown by arrow 9, causing the head element 12 and the shank portion 11 of the container 10 to move toward the plug 30' such that the end part 33A' of the plug 30' slides along the inclined end surfaces 24 of the ribs 22. The end part of plug 30' acts as a cam and forces the ribs 22 to expand the central part of the shank portion 11 radially outward and break the shank portion 11 along the slots 20 into strips, as is shown in FIG. 8. The strips form passages therebetween to permit the chemical agent 2, if it is in a jelly-like or liquid form, to be immediately released and mix with the sap of the tree 3, or to permit the sap of the tree 3, if the chemical agent is in the form of a tablet or a powder, to immediately permeate and mix with the chemical agent. Because passages are located in the central part of shank portion 11, they are more precisely aligned with the phloem layer of tree 3. The chemical agent contained in the cavity 14 of the capsule 1 is, therefore, more precisely and immediately released into this phloem layer. Since the outer diameter of the head element 12 of the capsule 1 is larger than the inner diameter 6 of the originally pre-drilled bore 4, a very tight fit will be obtained between the head element 12 of the capsule 1 and the opening of the bore of the tree 3 after the impact force has been applied. This causes the capsule 1 to be held very firmly in the tree 3. The central parts of strips 20A formed from the shank portion 11 will also be pressed against the internal surface of the bore 4 and be frictionally engaged with the internal surface, so as to contribute to retention of the capsule 1 firmly in bore 4 of the tree 3. Because the plug 30' is formed with an internal cavity 34' having solid circumferential walls and closed ends 35' and 36', the chemical agent contained in the internal cavity 34' of the plug 30' will be released into the tree to be treated some time after the chemical agent contained in the internal cavity 14 is released into the tree. This is because it will take a while for the polyvinylalcohol material of which the plug 30' is made to be broken down by the sap of the tree. Consequently, the chemical agent contained in the internal cavity 14 may be used to treat the tree in one season of the year while the chemical agent contained in the internal cavity 34' may be used to treat the tree in a subsequent season.

When using a capsule including two plugs, such as plugs 30 and 30' of the capsule 1 shown in FIG. 5, because the plugs are produced from polyvinylalcohol or a similar material, the walls of plugs 30 and 30' will break down at different times. The chemicals, therefore, will pass into the sap of the tree at different times. Consequently, the same capsule can be filled with chemicals in separated volumes, and the thicknesses of the walls of the plugs 30 and 30' will determine when each chemical will start to bleed out from the plugs. The plugs can be filled with many kinds of pesticides and/or fertilizers for different purposes, various herbicides, metals such as iron, copper and zinc, and so on.

Figure 6:
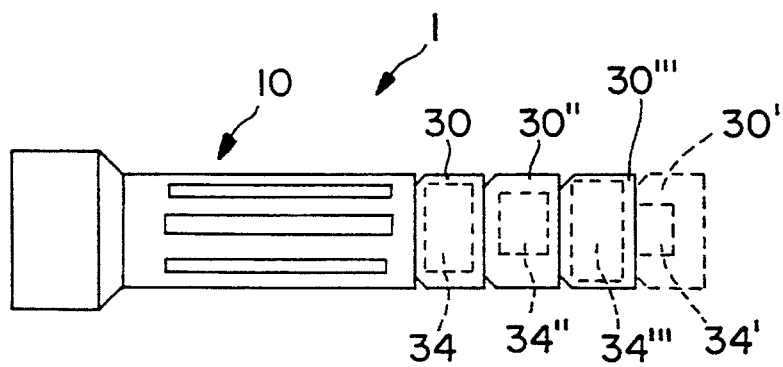
FIG. 6 is a side view of a capsule including additional intermediate plugs.

FIG. 6 illustrates the capsule 1 as including a plurality of intermediate plugs 30, 30" and 30''' provided between the cylindrical container 10 and the end plug 30', which is shown in phantom. As is clear from FIG. 6, these intermediate plugs 30, 30" and 30''' have chemical agent containing volumes 34, 34" and 34''' formed therein. Plugs 30, 30" and 30''' have circumferential walls with varying thicknesses so that chemicals contained in the volumes 34, 34" and 34''' are released into the tree at different times. Except for the sizes of the volumes 34" and 34''' and of their second cylindrical portions (not shown), the intermediate plugs 34" and 34''' are substantially identical to the intermediate plug 30 described previously. Any desired number of intermediate plugs may be provided between the cylindrical container 10 and the end plug 30' so that any desired combination of successively released chemicals can be used to treat the tree over the course of time.

Various modifications to the particular constructions described above will be apparent to those skilled in the art. Such modifications are intended to be covered by the appended claims.

What is claimed is:

1. A tree treatment capsule for insertion into a bore in a tree comprising:
   a plastic container having a shank portion with a first internal cavity having an end opening containing therein a first chemical agent and a head element integrally formed with said shank portion remote from said end opening, said shank portion including a circumferential recess formed therein; and
   a plastic plug for sealingly closing said internal cavity, said plastic plug having an outer external diameter slightly smaller than the diameter of said end opening and a second internal cavity formed therein containing a second chemical agent;
   said plastic plug being partially insertable into said end opening so that a tight fit between said plastic plug and said end opening is provided;
   said shank portion being broken to release said first chemical agent from the first internal cavity immediately as an impact force is applied to said head element and moves said head element towards said plastic plug, said plastic plug being gradually broken down to release said second chemical agent after said first chemical agent has been released.

2. A tree treatment capsule as defined in claim 1, and further comprising at least one intermediate plastic plug, disposed between said plastic container and said plastic plug, containing at least one other chemical agent which is to be released at a different time from the first and second chemical agents.

3. A tree treatment capsule as defined in claim 2, wherein said plastic container, said plastic plug and said intermediate plastic plug are made of a material which is broken down by tree sap.

4. A tree treatment capsule as defined in claim 3, wherein said material is polyvinylalcohol.

5. A tree treatment capsule as defined in claim 3, wherein said plastic plug and said at least one intermediate plastic plug have walls of different thicknesses so that the chemical agents contained therein are released at different times.

* * * * *